Aug. 19, 1930.  W. B. RAYTON ET AL  1,773,436
POLARIZATION PHOTOMETER
Filed Oct. 23, 1926  3 Sheets-Sheet 1
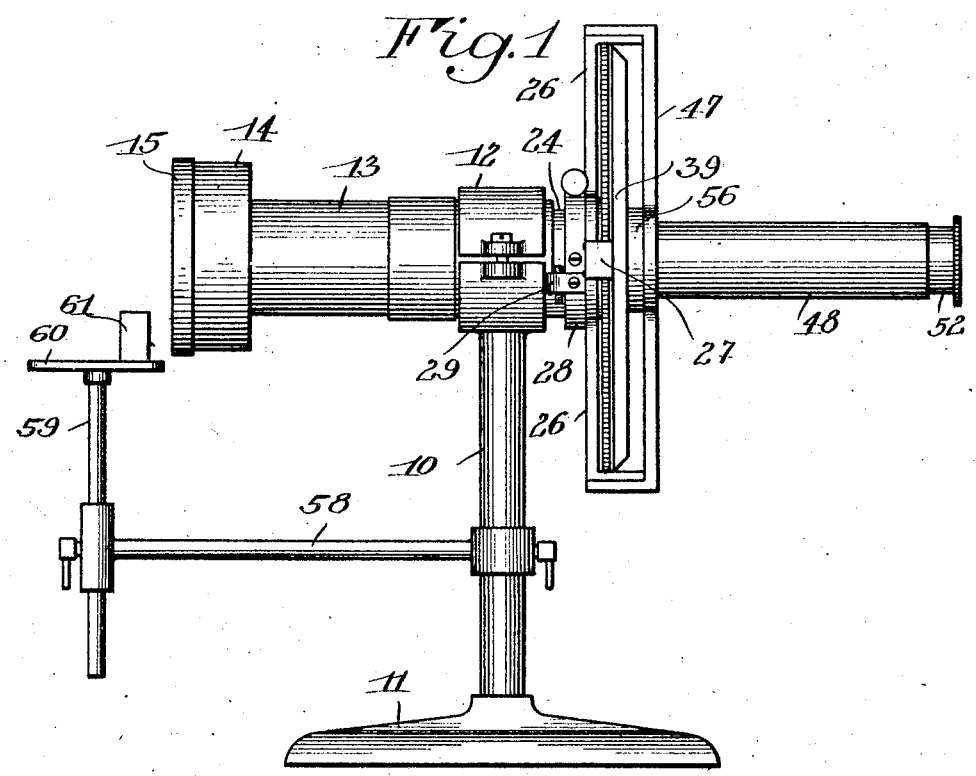
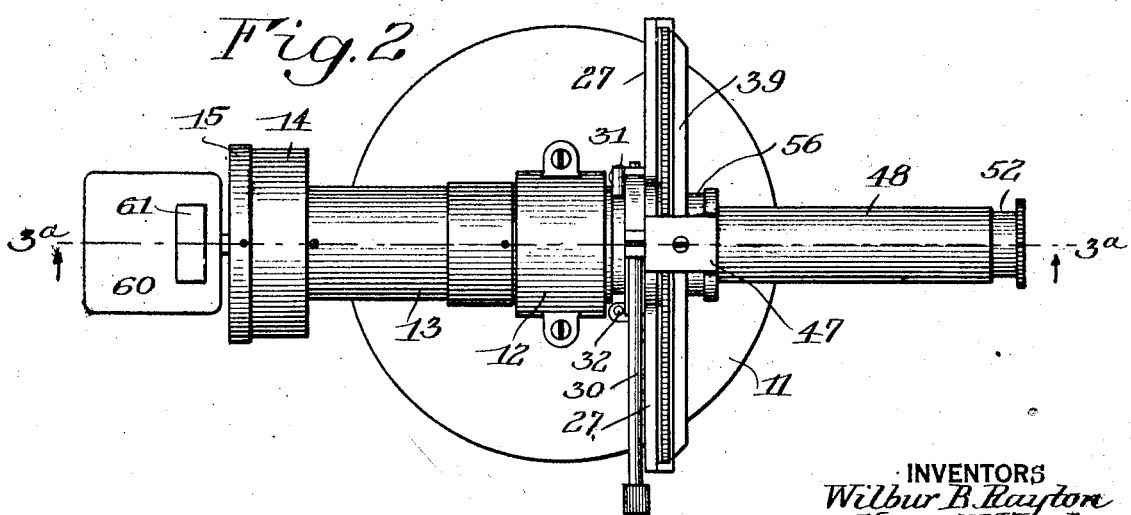
INVENTORS
Wilbur B. Rayton
Henry F. Kurtz
BY
their ATTORNEYS

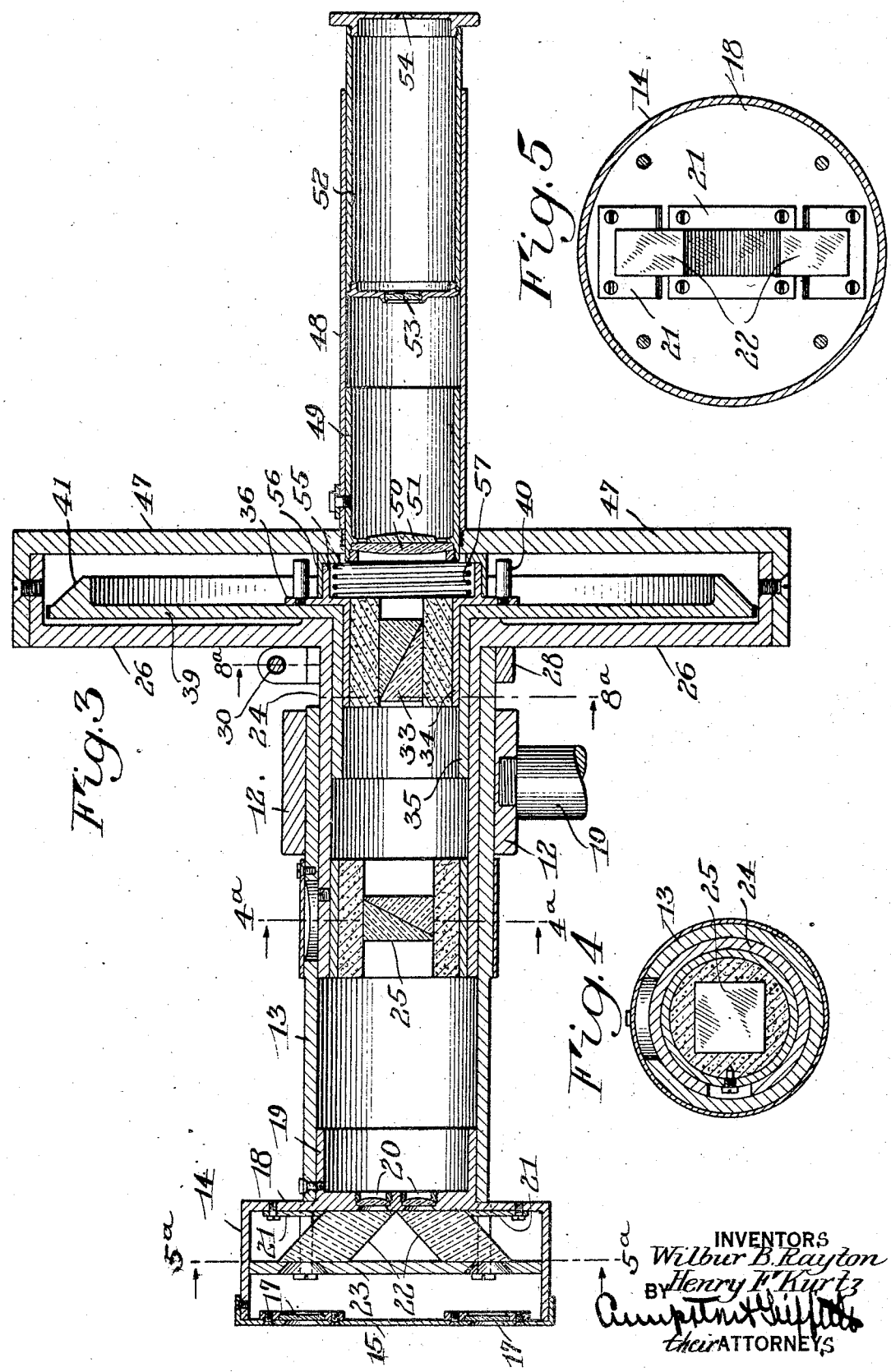

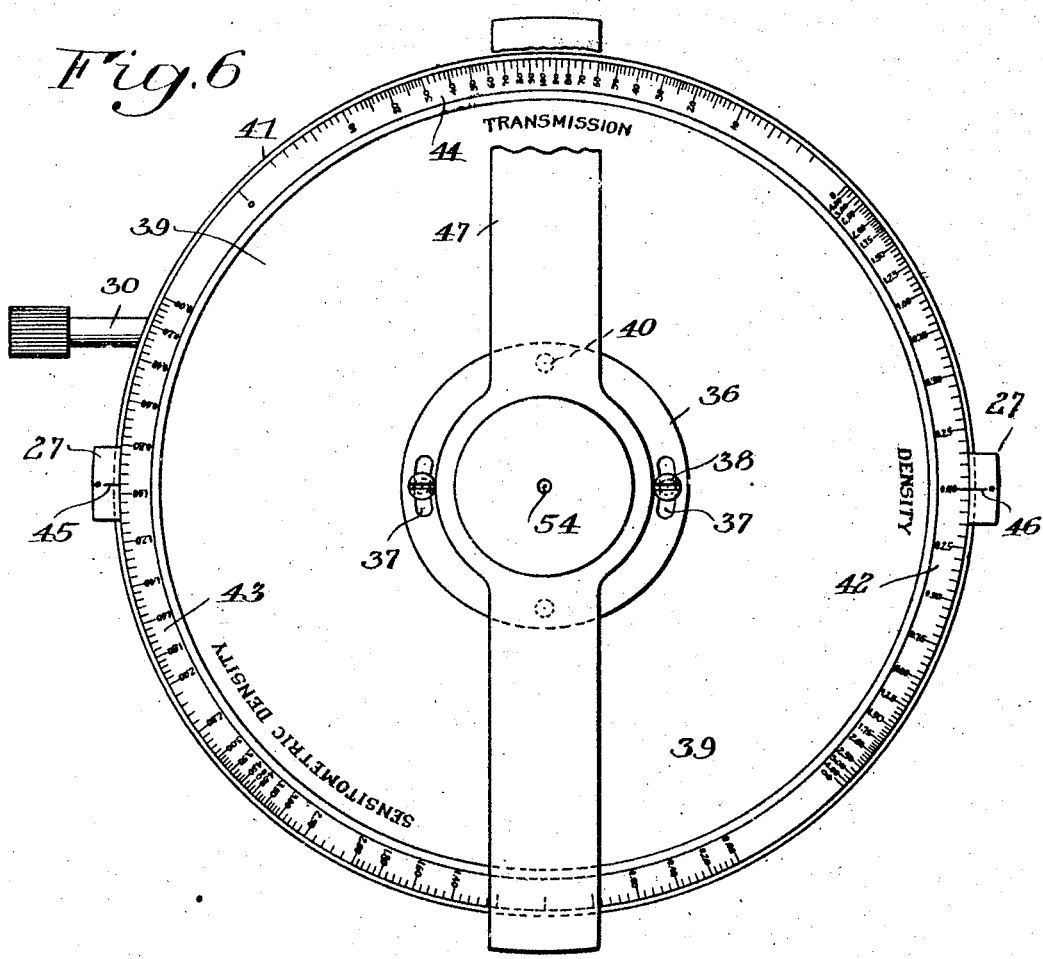
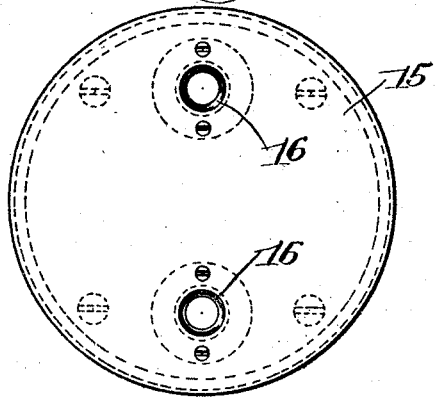
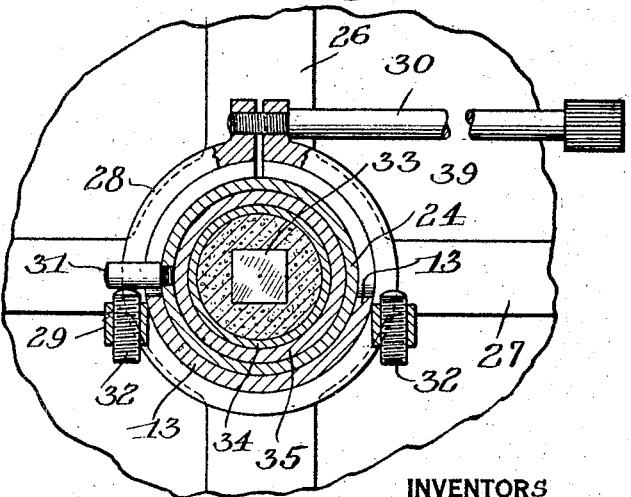

Patented Aug. 19, 1930

1,773,436

UNITED STATES PATENT OFFICE

WILBUR B. RAYTON AND HENRY F. KURTZ, OF ROCHESTER, NEW YORK, ASSIGNORS TO BAUSCH & LOMB OPTICAL CO., OF ROCHESTER, NEW YORK, A CORPORATION OF NEW YORK

POLARIZATION PHOTOMETER

Application filed October 23, 1926. Serial No. 143,554.

This invention relates to polarization photometers, having as one of its objects the provision of an instrument of this character constructed to indicate a desired measurement directly in terms of the unit of the condition or quantity to be measured, as for example, the appropriate units for expressing the light transmitting, density, or absorbing qualities of a substance, without the necessity for calculation of the desired measurement from different readings.

Another object is to provide such an instrument adapted for quantity production with uniform transmission, absorption or density scales, for example, which scales, of a given variety will not vary between individual instruments, whereby such instruments may be manufactured and repaired with greater economy and efficiency.

Another object is the provision of such an instrument unitarily assembled on a support so that the polarizing and analyzing portions may be reversed in position relative to the plurality of light admitting apertures for successive readings, whereby to obtain average readings.

A further object is to provide such an instrument having the above features in a closed form of construction for excluding dust from the light transmitting and optical portions.

A still further object is to provide an instrument of the above nature having various convenient adjustments, all arranged for ready access from the exterior of the instrument.

To these and other ends the invention resides in certain improvements and combinations of parts, all as will be hereinafter more fully described, the novel features being pointed out in the claims at the end of the specification.

In the drawings:

Figure 1 is a side elevation of an instrument embodying the present invention;

Figure 2 is a top plan view of the same;

Figure 3 is an enlarged sectional elevation on the line 3ª—3ª in Figure 2;

Figure 4 is a transverse sectional view on a line 4ª—4ª of Figure 3;

Figure 5 is a sectional view on line 5ª—5ª of Figure 3;

Figure 6 is a front view of an indicating device and associated parts;

Figure 7 is an end view as seen from the left in Figure 3; and

Figure 8 is a sectional view on line 8ª—8ª of Figure 3.

Similar reference numerals throughout the several views indicate the same parts.

The type of polarization photometer herein considered contains a polarizing element, an analyzing element and a system of prisms and lenses so arranged that a field, divided into two portions is viewed by the observer, the dividing line or lines between the portions of the field being very fine and sharp in accordance with accepted practice in photometer design. The field may be divided into two or more portions according to different conditions, the following description covering a simple two-part field, divided by a straight line. The principle is the same regardless of the number of portions of the field or their disposition. The portions of the field are illuminated by polarized light, that in one portion being polarized in a plane at 90° from that in the other portion. This field is viewed thru an analyzing prism which may be measurably rotated. The rotation of this analyzer causes the parts of the field to appear variably illuminated, the variation passing thru the following cycle of changes, providing and only when, the intensities of illumination incident upon the portions of the field are equal: First, when one portion of the field is at a maximum brightness, the other portion will be totally dark, this, being the point known as the "extinction point", and the zero of the angular scale attached to the analyzer is usually placed at this point. It is characterized by the fact that the plane of polarization of the light incident on the portion of the field which appears dark is at right angles to the plane of polarization of the analyzer. Since the plane of polarization of the light in the bright portion of the field is at right angles to that in the dark portion of the field, it will be parallel to the plane of polarization of the analyzer. Hence we have the appearance mentioned above, that is, one portion of the field being totally dark, the other at maximum brightness. Second, as the analyzer is rotated, the dark portion brightens and the bright portion darkens until a point is reached where the brightness of both portions is equal. This is usually known as the "match-point". In an ideal polarization photometer this point would be at precisely 45° rotation of the analyzer from the position of the "extinction-point" or the zero of the scale. For reasons to be discussed below this is rarely at exactly 45° but may be several degrees short of 45° or beyond 45°. Third, upon continuing rotation in the same direction, the portions again become unequally bright, until at 90°, we have another "extinction-point". At this "extinction point", however, the portion of the field that was dark at the first "extinction point" is now bright, and the portion that was bright at the first "extinction point" is now dark. Continuing the rotation, "match-points" will be found at approximately 135°, 225°, and 315°, and "extinction points", at 180°, 270°, and 360° or zero. Summing up, if we have both parts of the field illuminated by light of equal intensities, we will find in an ideal polarization photometer, four "extinction points" at 90° from each other and four "match points" at 90° from each other and disposed symmetrically with respect to the extinction points. If the intensity of the beam of light illuminating one portion of the field is modified, as for instance by introducing into one of the illuminating beams a specimen of which we wish to measure the transmission, the "match-points" will be shifted from symmetry with respect to the "extinction points". The amount of this shift is a mathematical function of the intensity difference between the two beams, and this function is established by well known laws of physics. The device therefore provides an advantageous means for measuring the intensity of a light beam and thereby the transmission, absorption or density of the specimen.

It has been necessary to provide polarization photometers with simple angular scales heretofore, because the "match points" in individual instruments differ from 45°, 135°, 225°, and 315° by varying amounts. The nature of this difference has been such that its effect is eliminated in the mathematical calculation involved in converting angular readings into light intensities. It has, however, precluded the practical application of direct reading scales, graduated in terms of transmission, absorption or density.

It is understood in this art that the terms, transmission, absorption, and density are names used to represent different aspects of the same quality of a substance. Hence, in the appended claims, the term transmission is used in a broad sense as inclusive of both absorption and density as well.

Such scales would be of great advantage to the user because the time and danger of error involved in the mathematical calculation would be eliminated. It is true that such scales could be added to an individual instrument, but the nature of the shifting of the "match points" is such that scales would be alike in opposite quadrants and unlike in adjacent quadrants. Such a procedure would be highly expensive, and further, each time it became necessary to take the instrument apart for cleaning or other purposes, as when certain of the optical parts had to be replaced there would exist the probable necessity for new scales. The disadvantage of such conditions from the standpoints of manufacture and use are obvious, so that polarization photometers have heretofore been made only with angular scales with the attendant need for mathematical calculation to reduce readings to transmission, absorption or density, and to eliminate error due to the "match point" shift.

The optical systems used heretofore in polarization photometers have generally been of such a nature that certain elements of them were of necessity placed between the polarizing and analyzing elements. It has been found that these intermediate elements have modified the degree of polarization, the position of the plane of polarization or the intensities of the light beams, or have caused a combination of such modifications with the result that the "match points" are shifted from symmetry in the manner described above.

The polarization photometer described herein is characterized by the absence of any optical elements between the polarizing element and the analyzing element, with the result that the "match points" are always symmetrical with respect to the extinction points. It may now be stated that polarization photometers are provided with various kinds of optical systems, each adapted to the particular use for which the instrument is intended, as for instance as a part of a spectro-photometric equipment, or as a laboratory protometer, as a density meter, or as adapted to the requirements for measuring the light transmission of other optical instruments. The variations in the optical systems are necessary for the placing of pupils, images, fields, etc., in the locations suited to the work for which the photometer is to be used. The application of this invention is not restricted to any one of these instruments, but it is applicable to all polarization photometers regardless of application.

The present embodiment of the invention comprises a supporting standard 10, Figure 1, on a base 11, the standard having a split clamping bearing 12 in which is fixed a tubular housing 13. The latter, as best shown in Figure 3, carries at its outer end a box 14 the outer side 15 of which is formed with a plurality of light apertures or windows 16, Figure 7. These apertures are normally closed as shown by glass plates 17 to exclude the dust. The opposite side 18 of the box has a flange 19 fitting in the outer end of a tubular housing 13 and this end of the box is formed with a pair of adjacent light apertures 20, fitted if desired with suitable lenses, as shown in Figure 3. Secured to the end 18 of the box is a plate 21, Figure 5, having a rectangular opening in which are supported the ends of a pair of rhomboid prisms 22 for separating the axes of the two beams of light transmitted through the windows 17. The prisms are held in position by means of an apertured plate 23 suitably secured as shown in Figure 3.

A second tubular housing 24 is mounted for rotary adjustment in the opposite end of the tube 13, this having mounted on the axis thereof in any suitable manner the polarizing prism 25 which may be of any suitable known variety such for example, as a "Wollaston" prism which requires no detailed description. Tube 24 at its opposite end has a pair of oppositely extending arms 26 and perpendicularly thereto a pair of similar arms 27, Figure 2, the purpose of which will presently appear. Tube 24 is releasably clamped in tube 13 by means comprising a split collar 28 supported by means of arms 29 on the end of the tube and collar 28 is tightened by means of a spindle 30. Tube 24 has fixed thereon a pin 31 adapted to be brought by the rotation of the tube against oppositely disposed set screws 32 carried in the arms 29. Thus, by turning spindle 30 collar 28 is loosened and tube 24 may be rotated through 180 degrees to reverse the position of the polarizing and analyzing elements and the optical means, all of which are carried by tube 24, relative to the light apertures of tube 13 for obtaining an average reading.

The analyzing prism may be of any known or suitable variety, being in the present instance, a Glan-Thomson prism indicated at 33 which is well known in the art and therefore requires no particular description. This prism is mounted in any suitable manner in a sleeve 34 rotatably adjustable in a tube 35. The prism sleeve 34 has a laterally extending flange 36, Figures 3 and 6, formed with elongated slots 37 for receiving retaining screws 38 threaded into a flanged disc or wheel 39 on the end of the sleeve 35, the disc having pins 40 by which to rotate and adjust the prism holding sleeve 34. The prism sleeve 34 may be clamped in different positions of adjustment relative to sleeve 35 by means of the screws 38.

The disc or wheel 39 of the analyzing prism tube 35 has a beveled rim 41 marked in spaced relation about its circumference with a density scale 42, a sensitometric density scale 43 and a transmission scale 44. For cooperation with these scales, diametrically disposed indexed marks 45 and 46 are provided on the ends of the arms 27. It will be noted that the wheel or disc 39 may be readily clamped with the fingers and rotated to thereby rotate the analyzing prism 33 relative to the polarizing prism for positioning the polarizing prism in the "match-points", for example, and that such positions of the prism are indicated by the scales on the wheel 39 in cooperation with the index marks 45 and 46, depending upon the position of reversal of sleeve 24 relative to the light apertures.

The cooperating optical system is carried by a pair of arms 47 secured at their outer ends to the ends of the arms 26 so as to bridge the wheel or drum 39. Screwed into the center of arms 47 is a tube or housing 48 in which is carried a sleeve 49 having secured in its inner end in any suitable manner, an objective lens 50 and also a biprism 51, the latter for providing a sharp and proper dividing line between the light beams from the respective apertures 16 and also for proper pupil location. Adjustable in the outer end of the optical tube 48 is a sleeve 52 having a suitably mounted eye piece lens 53 and a sight opening 54. The sleeve 52 is longitudinally slidable in tube 48 for focusing purposes, it being understood that the optical system carried by tube 48 may be of any suitable or known variety so that as its optical elements do not require further description. For the purpose of completely enclosing the light transmitting and optical portions, the sleeve 34 has a longitudinally extending flange 55 on which slides a sleeve 56 Figure 3. A spring 57 serves to extend sleeve 56 longitudinally to maintain contact of its farther end with the hub portion of the arms 47 to thereby close the system at this point.

It is to be noted that the polarizing and analyzing elements are proximately arranged on the axis of the instrument so that the light beams are transmitted directly from the polarizing element through an optically free space to the analyzing element and that the separating or dividing element or biprism 51, together with the lenses of the optical system are located wholly at the side of one of these elements, the analyzing element, which is farther from the other element. In other words, the optical portions, as distinguished from the polarizing and analyzing portions are located wholly outside of the latter and not between them so that there is no interference with the true transmission of light between such elements.

Figures 1 and 2 show a bracket arm 58 on standard 10 carrying a post 59 and a table 60 on which a test specimen 61 may be supported, this being merely illustrative of one use for the photometer which is obviously adapted for various uses and in cooperation with various other apparatus as well understood in the art. The invention thus provides a photometer of the character described from which readings of desired measurements may be quickly and accurately made directly from the indicating device of the instrument in terms of the final units desired without the necessity for tedious calculations, with their tendency to error. In addition to this advantageous result the invention provides an efficient form of construction in which the parts are conveniently and fully adjustable with access for such adjustment from the exterior. The construction is furthermore of a self contained and unitary character in which the parts are fully enclosed and protected from dust and injury.

We claim as our invention:

1. A polarization photometer comprising a polarizing element, an analyzing element and co-operating beam separating and lens elements, the said separating and lens elements being arranged at the side of said analyzing element which is farther from said polarizing element, means for effecting relative adjustment between said polarizing and analyzing elements, said means being provided with scale means for indicating said adjustment directly in terms of light transmission.

2. A polarization photometer comprising a polarizing element for polarizing light in two perpendicular planes and an analyzing element and co-operating beam separating and optical means, in which an optically free space is interposed in the axis between said polarizing and analyzing elements.

3. A polarization photometer comprising a support, a housing on said support provided with a plurality of light apertures, a second housing on said support carrying polarizing and analyzing means and means for rotating one of said housings relative to the other on said support through an angle of 180 degrees.

4. In a polarization photometer, a support, a closed tubular housing fixed on said support provided with means for transmitting separate light beams, a second closed tubular housing rotatably adjustable in said first housing and carrying polarizing and analyzing elements, and a device for adjusting one of said elements relative to the other provided with an indicating scale.

5. A polarization photometer comprising a polarizing unit for polarizing light in two planes and a rotatable analyzing unit, said units being separated by a free air space whereby the extinction points will be symmetrically arranged with respect to the match points.

6. A polarization photometer comprising a polarizing unit for polarizing light in two perpendicular planes, a biprism and an analyzing unit, said analyzing unit being positioned between said polarizing unit and said biprism.

7. A polarizing photometer comprising a polarizing unit for polarizing light in two planes, an analyzing unit mounted for adjustment relative to said polarizing unit, said units being proximately arranged with an optically free space therebetween, and scale means associated with said analyzing unit for indicating said adjustment directly in terms of the desired measurements.

WILBUR B. RAYTON.
HENRY F. KURTZ.